(12) United States Patent
Akrav

(10) Patent No.: US 10,810,724 B2
(45) Date of Patent: Oct. 20, 2020

(54) AUTOMATIC SYSTEM FOR SEPARATING AND IDENTIFYING INSECTS ON LEAVES

(71) Applicant: Pinhas Yosef Akrav, Bnei Brak (IL)

(72) Inventor: Pinhas Yosef Akrav, Bnei Brak (IL)

(*) Notice: Subject to any disclaimer, the term of this patent is extended or adjusted under 35 U.S.C. 154(b) by 8 days.

(21) Appl. No.: 16/199,252

(22) Filed: Nov. 26, 2018

(65) Prior Publication Data

US 2019/0164272 A1 May 30, 2019

(30) Foreign Application Priority Data

Nov. 30, 2017 (IL) .......................................... 256031

(51) Int. Cl.
| | | |
|---|---|---|
| *G06T 7/00* | (2017.01) | |
| *A01M 99/00* | (2006.01) | |
| *G06K 9/46* | (2006.01) | |
| *G06K 9/62* | (2006.01) | |

(52) U.S. Cl.
CPC ........... *G06T 7/0002* (2013.01); *A01M 99/00* (2013.01); *G06K 9/46* (2013.01); *G06K 9/6267* (2013.01); *A01M 2200/01* (2013.01); *G06T 2207/20* (2013.01); *G06T 2207/30004* (2013.01)

(58) Field of Classification Search
CPC ........... G06T 2207/30188; G06T 2207/30242; G06K 9/6276; A01M 99/00; A01M 2200/01; A01M 2200/011; A01M 2200/012; A01M 1/026
See application file for complete search history.

(56) References Cited

U.S. PATENT DOCUMENTS

| | | | | |
|---|---|---|---|---|
| 8,705,017 | B2 * | 4/2014 | Hyde | A01M 1/226 356/28 |
| 10,043,263 | B1 * | 8/2018 | Fryshman | A01M 7/00 |
| 10,445,584 | B2 * | 10/2019 | Gu | G06K 9/6267 |
| 2002/0157190 | A1 * | 10/2002 | Imai | D06F 1/04 8/159 |
| 2010/0071255 | A1 * | 3/2010 | Zilbershlag | A01M 1/026 43/107 |
| 2017/0287160 | A1 * | 10/2017 | Freudenberg | A01M 1/026 |

(Continued)

FOREIGN PATENT DOCUMENTS

| | | | | |
|---|---|---|---|---|
| CN | 103027009 A | * | 4/2013 | ........... A01K 67/033 |
| CN | 104155312 B | * | 6/2017 | ............... G06T 7/00 |

OTHER PUBLICATIONS

Chaudhari et al.; "Dynamic Features Extraction System of pets on Plants Processing"; Mar. 1, 2019; 2019 3rd International Conference on Computing Methodologies and Communication (ICCMC) (pp. 1201-1205) (Year: 2019).*

(Continued)

*Primary Examiner* — John Villecco

(57) ABSTRACT

An automatic separating and identifying system of insects on leaves that includes an insects separation system, an insects dispersing system, and an insects identification system. The insects separation system includes a circulating container and water circulation mechanism. The dispersing system includes an examination mesh that is designed to receive the water with the insects. The identification system includes a camera, lighting means, a computer with a database and algorithm, and is designed to identify types and amounts of the insects on the examination mesh.

1 Claim, 5 Drawing Sheets

(56) References Cited

U.S. PATENT DOCUMENTS

2019/0223431 A1* 7/2019 Rustia ................ G01J 1/4204
2020/0019765 A1* 1/2020 Ampatzidis ........ G06K 9/00362

OTHER PUBLICATIONS

Huddar et al.; "Novel algorithm for segmentation and automatic identification of pests on plants using image processing"; Jul. 1, 2012; 2012 Third International Conference on Computing, Communication and Networking Technologies (ICCCNT'12) (pp. 1-5) (Year: 2012).*

* cited by examiner

AUTOMATIC SYSTEM FOR SEPARATING AND IDENTIFYING INSECTS ON LEAVES

TECHNICAL FIELD

The present invention refers to an automatic system for separating insects from leaves and identifying these insects.

BACKGROUND ART

Entomological laboratories perform tests for identifying types and quantities of insects on leaves of plants, including edible leaves. Usually, the lab technician shakes the leaves over a mat for separating the insects from the leaves and identifying the insects that fall onto the mat. In the Jewish Kosher world, the person who performs the test soaks the leaves in water with soap three times and then filters the water through a 120-micron density mesh, and then it is possible to identify the insects that remain on the mesh. Identifying the types and quantities of those insects is performed by a professional expert who knows how to identify miniature insects and knows how to distinguish between different types of insects. The above actions are cumbersome, inefficient, and require skilled professionals and therefore relatively expensive. The invention subject matter of the present patent application discloses a system that overcomes these problems.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

The object of the present invention is to provide an automatic separating and identifying system (1) of insects on leaves (1). The automatic system (1) is designed to perform the separation of the insects from the leaves and the insect identification automatically and operated by none expert employee.

Figure 1:
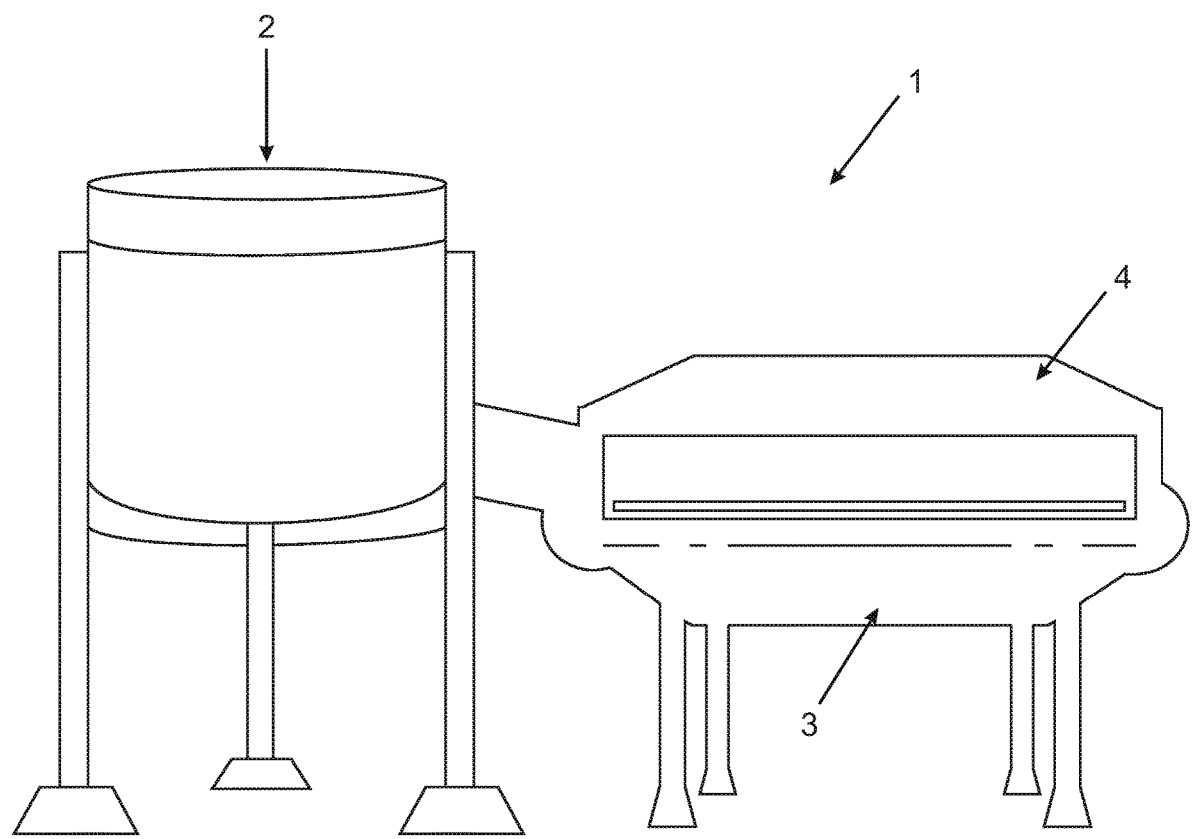
FIG. 1 depicts schematically the automatic separating and identifying system (1).

The automatic separating and identifying system (1) includes an insects separation system (2), an insects dispersing system (3), and an insects identification system (4). FIG. 1 depicts schematically the automatic separating and identifying system (1).

The insects separation system (2) includes a circulating container (21) and water circulation mechanism (22). The circulating container (21) includes a flush opening (211). The circulating container (21) may additionally include an axial cover (212) with an opening arm (213), a water inlet (214) which is designed to be connected to a water pipe (220) that is connected to a water source, and a soap inlet (215) which is designed to be connected to a soap container (217). The bottom (216) of the circulating container (21) may be separable, enabling an efficient cleaning of the container (21). The insects separation system (2) may additionally include a soap pump (218) that stream soap from the soap container into the circulating container (21) through a soap pipe (219).

The water circulation mechanism (22) is designed to circulate the water and the leaves inside the circulating container (21) and may includes a circulating pump (221) that streams water or air through a pressure inlet (222) on the side wall of the circulating container (21) into the circulating container (21) that circulates the water and the leaves or a rotational mean (224) inside the container 21 that rotates and circulates the water and the leaves inside the container 21, equipped with an activator.

The insects separation system (2) is designed to receive the leaves, water through the water inlet and soap through the soap pipe. The leaves with the soap water are circulated by the water circulation mechanism (22) inside the container 21. As a result, the insects in the leaves are separated from them. The soap assists to release the insects from the leaves.

Figure 2:
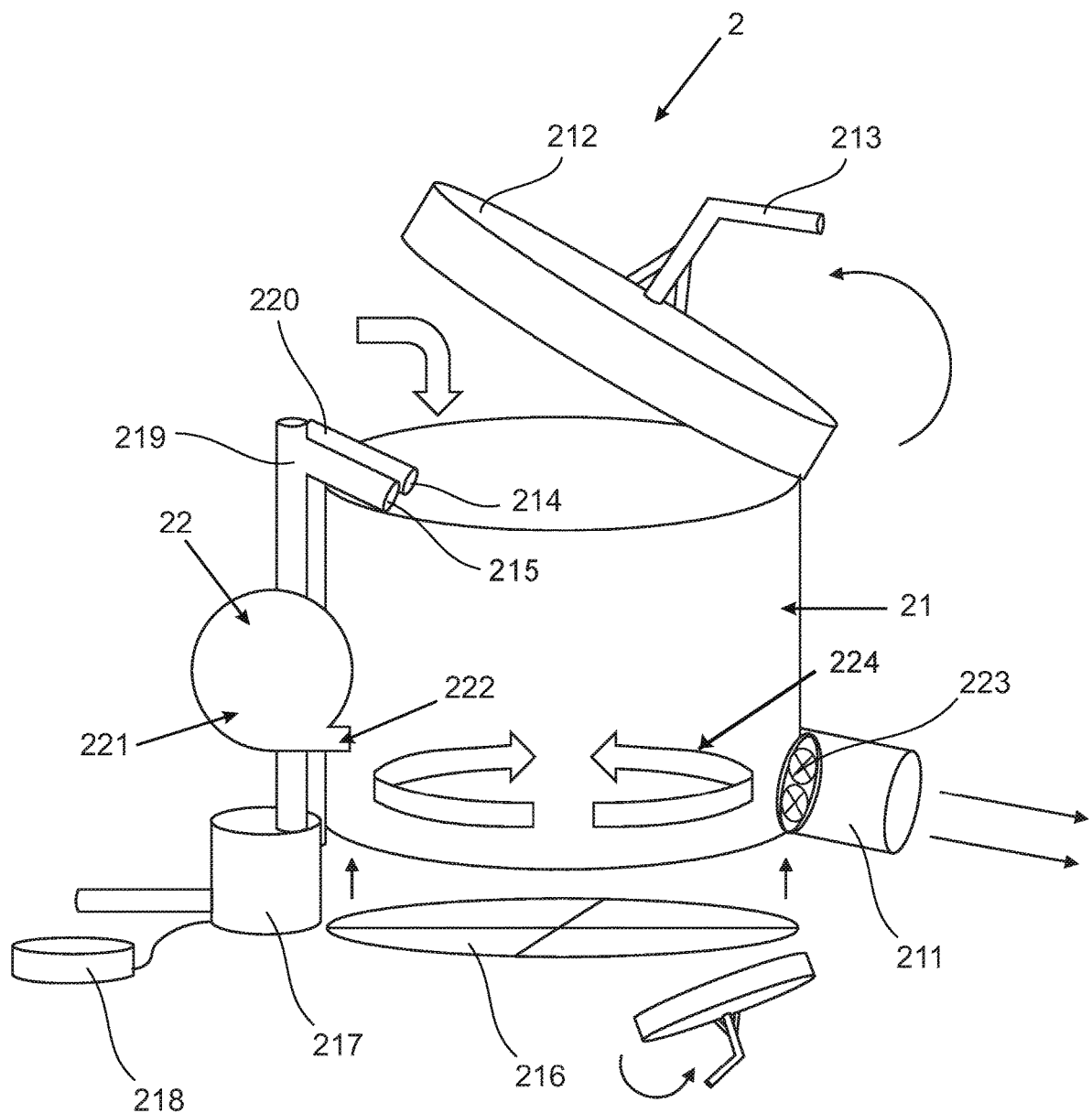
FIG. 2 depicts schematically the insects separation system (2).

After soaking and circulating the leaves with the water and soap the water with the insects and small parcels of dirt flows outside from the circulating container (21) through the flush opening (211). The flush opening is closed during the soaking and circulating process and is opened in the end of it. The flush opening (211) may include a filtering mesh (223), preferably a 1.5-mm density mesh, for blocking small parts of leaves. The water and the insects flow through the flush opening (211) to the dispersing system (3). FIG. 2 depicts schematically the insects separation system (2).

The dispersing system (3) is designed to receive the water with the insects from the insects separation system (2), to filter the water and to disperse the insects on an examination mesh (31). The dispersing system (3) includes the examination mesh (31), preferably a 120-microne density mesh. The water and the insects flushed onto the examination mesh (31), the water seeps through the mesh and the insects remain on the examination mesh (31) for the analysis process done by the identification system (4).

Figure 3:
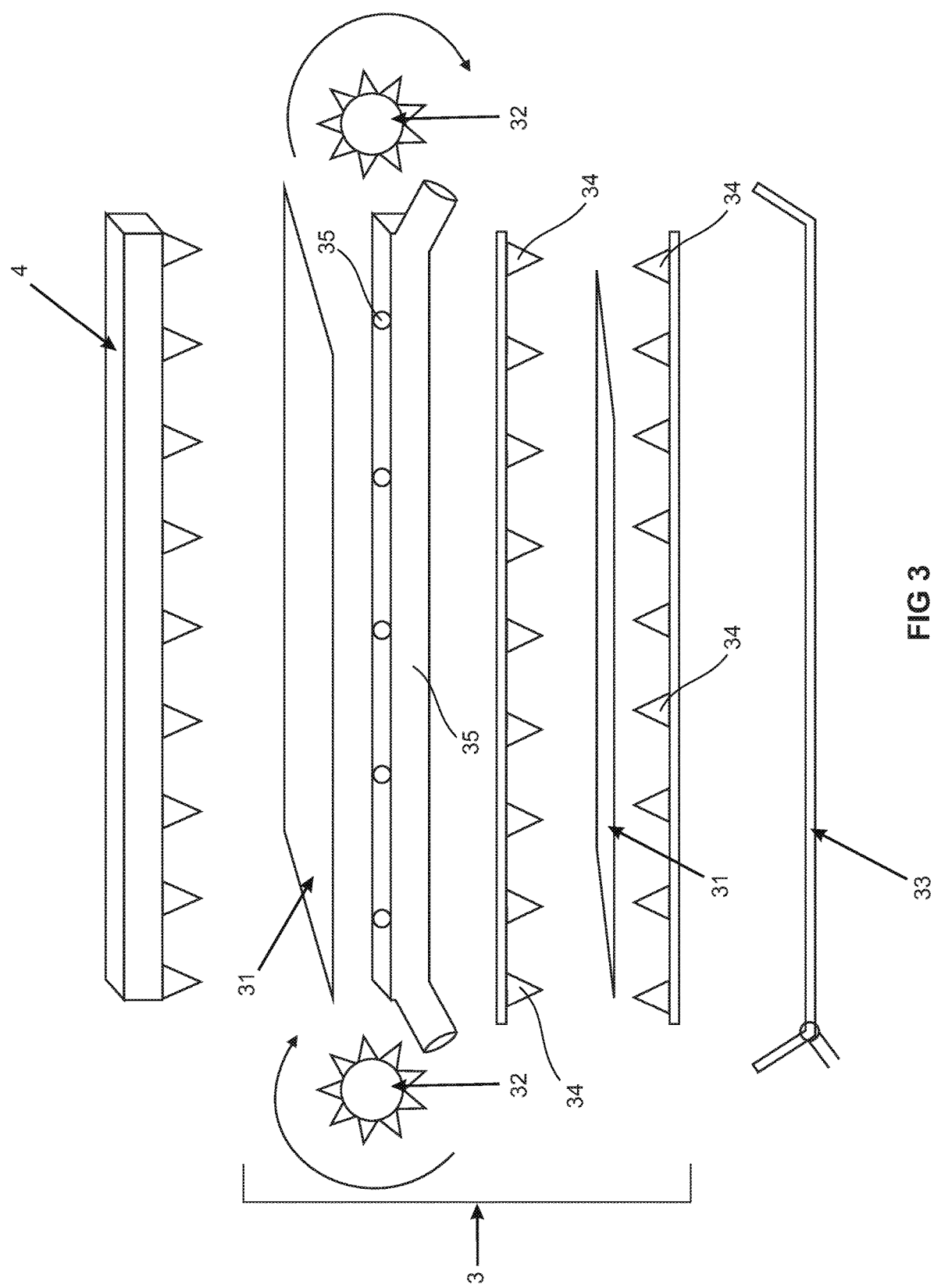
FIG. 3 depicts schematically the dispersing system (3).
Figure 5:
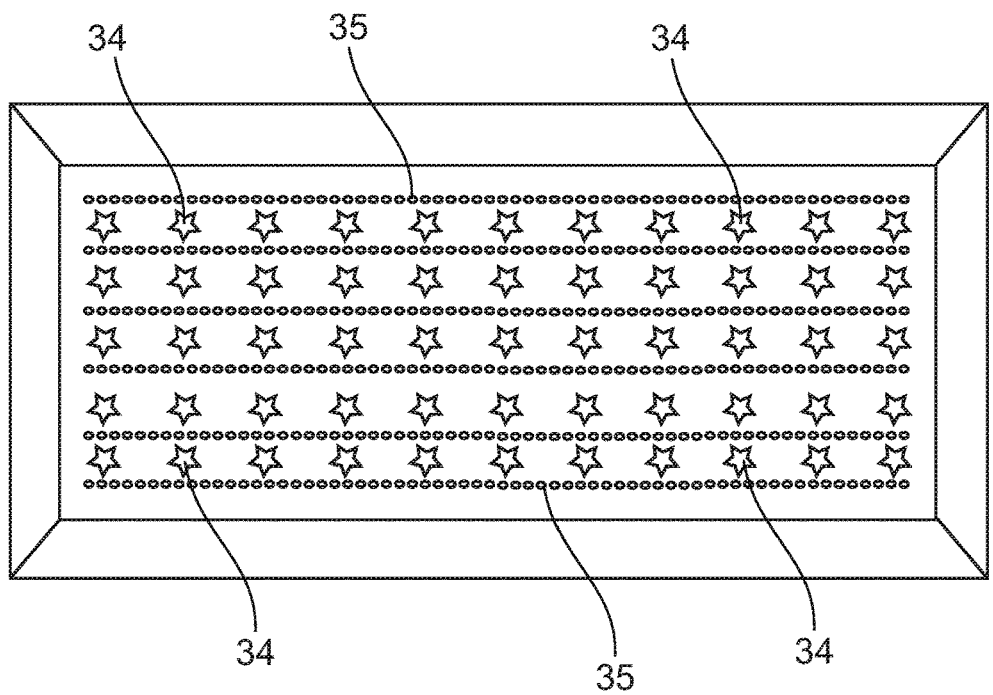
FIG. 5 depicts schematically the lighting means (35) and the cleaning sprayers (34) of the dispersing system.

The dispersing system (3) may additionally include a pair of motorized conveyor pulleys (32) on which the examination mesh (31) is assembled in a way that it can be rotate. The examination of the insect is done on the upper part of the mesh and when the examination is over the mesh rotates over the pulleys and when the dirty part of the mesh is on the bottom it is possible to clean it by a reverse water jet from cleaning sprayers (34), which may be positioned above and under the bottom part of the mesh (31). The dispersing system (3) may additionally include a drainage basin (33) for the drainage water. After the cleaning the mesh rotates again and its upper part is clean for receiving water with insects for another examination. The dispersing system (3) may additionally include lighting means (35), such as LED bulbs, which are positioned under the upper part of the mesh, and by that the insects on the mesh are more clearly visible. It is preferably that the LEDs will be waterproofs or protected against water. FIG. 3 depicts schematically the dispersing system (3). FIG. 5 depicts schematically the lighting means (35) and the cleaning sprayers (34) of the dispersing system.

The identification system (4) includes a camera (41), lighting means (42) such a LED bulbs, a computer (43) with a database (44) and algorithm (45). The identification system (4) is designed to identify the types and amounts of insects on the examination mesh (31). The camera (41) films the examination mesh (31), transmits the film to the computer (43) and the algorithm (45) analyze the images in the film also by comparing them to images of insects that stored in the database (44), similar in a way to a face recognition process. It is preferably that the identification system (4) will includes several cameras (41) to cover all the upper part of the mesh 31 on which the dirt and the insects are spread. The identification system (4) should have a high quality characteristic of visibility and enlargement of the filmed objects. It is preferably that also these LEDs will be waterproofs or protected against water.

Figure 4:
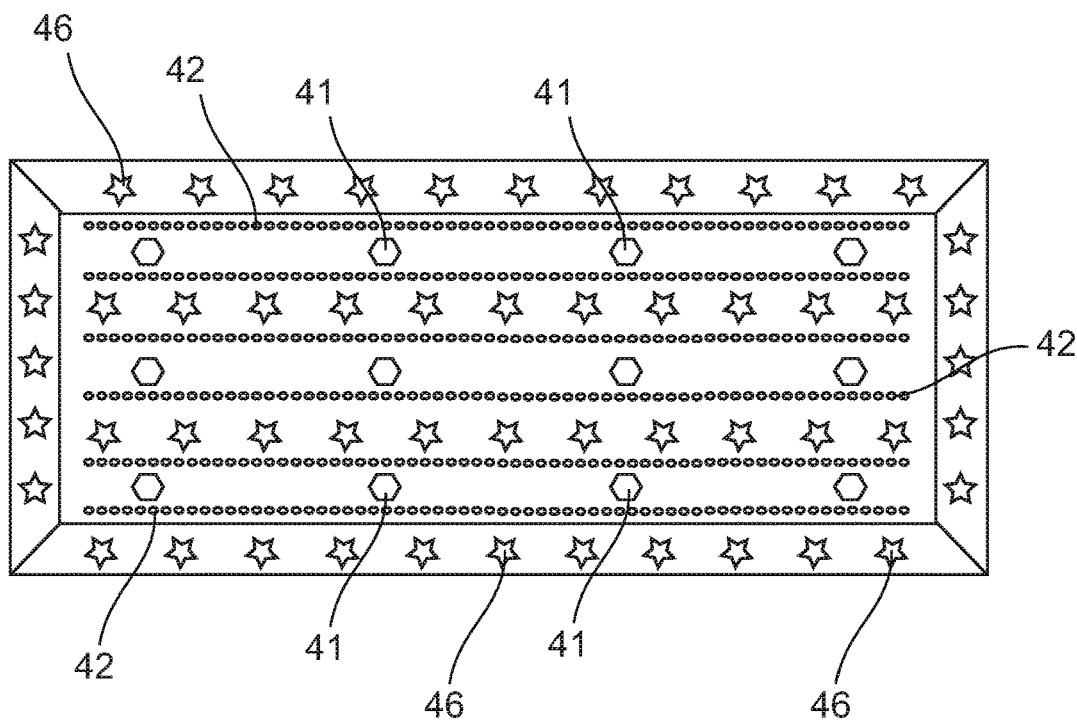
FIG. 4 depicts schematically the cameras (41), lighting means (42) and the sprayers (46) of the identification system (4).
Figure 6:
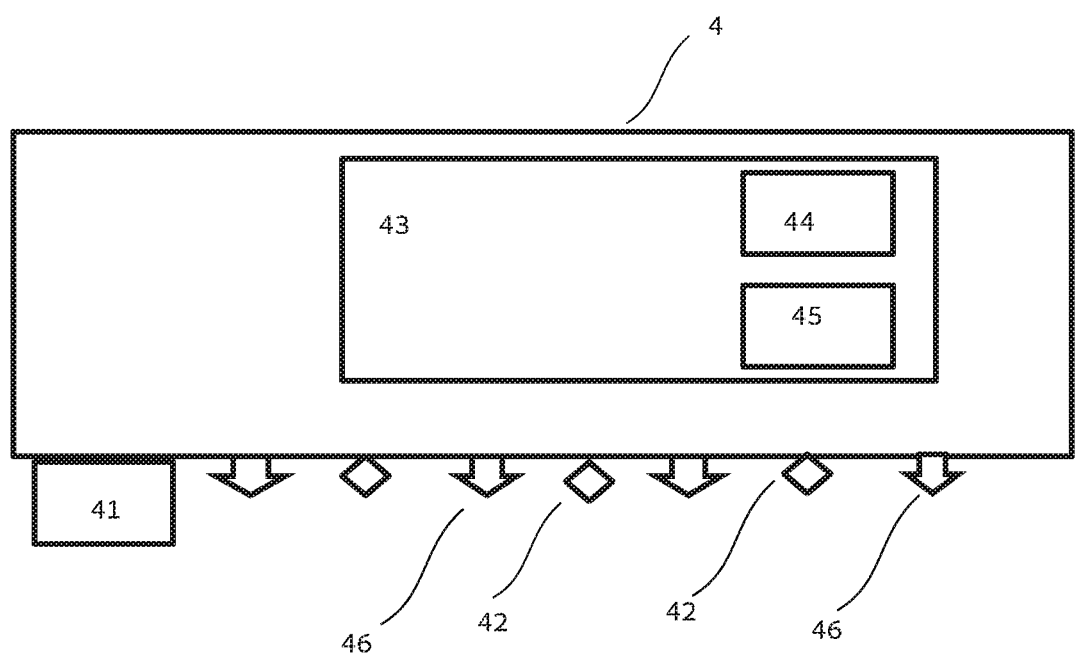
FIG. 6 is a schematic depiction of the identification system (4).

The identification system (4) may also include tiny sprayers (46) that are designed to splash water on the mesh (31) for spreading the dirt and the insects. FIG. 4 depicts schematically the cameras (41), lighting means (42) and the sprayers (46) of the identification system (4). FIG. 6 is a schematic depiction of the identification system (4).

The computer (43) is designed to operate the automatic separating and identifying system (1), its functions and its components. For example, the computer controls and operates the followings: streaming water and soap into the circulating container (21); activating the water circulating mechanism (22); closing and opening the flush opening (211); rotating the mesh (31) for example during the process so the insects will spread all over its top and in the end of each examination for cleaning the mesh; activating the camera (41), the lighting means (42) and the sprayers (46); rotating the mesh (31) for cleaning and activating the cleaning sprayers (34); and so on.

The computer (43) and the algorithm (44) identify the insects that filmed by the camera and provide output that may include the types and the amounts of those insects.

The automatic separating and identifying system (1) may be implemented with different sizes for laboratories, food industries, restaurants, and even for private homes. It is possible to use just the insect separation system (2) and to complete the examination of the insects by a person skilled in the art for the identification of the insects.

What is claimed is:

1. An automatic separating and identifying system (1) of insects on leaves (1), comprising an insects separation system (2), an insects dispersing system (3), and an insects identification system (4);

wherein the insects separation system (2) includes a circulating container (21) and water circulation mechanism (22); wherein the circulating container (21) includes a flush opening (211); wherein the insects separation system (2) is designed to receive leaves and water; wherein the water circulation mechanism (22) is designed to circulate the water and the leaves inside it; wherein the dispersing system (3) includes an examination mesh (31) and is designed to receive the water with the insects from the insects separation system (2);

wherein the identification system (4) includes a camera (41), lighting means (42), a computer (43) with a database (44) and algorithm (45); wherein the identification system (4) is designed to identify types and amounts of insects on the examination mesh (31);

wherein the camera (41) films the examination mesh (31), transmits the film to the computer (43) and the algorithm (45) analyze the images in the film by comparing them to images of insects that stored in the database (44); wherein the computer (43) is designed to operate the automatic separating and identifying system (1), its functions and its components.

* * * * *